United States Patent
Lai et al.

(10) Patent No.: US 9,111,049 B2
(45) Date of Patent: Aug. 18, 2015

(54) APPARATUS FOR COUPLING TO A USB DEVICE AND A HOST AND METHOD THEREOF

(71) Applicant: VIA TECHNOLOGIES, INC., New Taipei (TW)

(72) Inventors: Yi-Lin Lai, New Taipei (TW); Hao-Hsuan Chiu, New Taipei (TW); Terrance Shih, New Taipei (TW)

(73) Assignee: VIA TECHNOLOGIES, INC., New Taiperi (TW)

( * ) Notice: Subject to any disclaimer, the term of this patent is extended or adjusted under 35 U.S.C. 154(b) by 232 days.

(21) Appl. No.: 13/706,579

(22) Filed: Dec. 6, 2012

(65) Prior Publication Data
US 2013/0151749 A1    Jun. 13, 2013

Related U.S. Application Data

(60) Provisional application No. 61/567,741, filed on Dec. 7, 2011.

(30) Foreign Application Priority Data

Aug. 29, 2012  (EP) .................................... 12182112

(51) Int. Cl.
- G06F 13/40 (2006.01)
- H02J 7/00 (2006.01)
- G06F 1/26 (2006.01)
- G06F 13/42 (2006.01)

(52) U.S. Cl.
CPC ............ G06F 13/4022 (2013.01); G06F 1/266 (2013.01); G06F 13/4068 (2013.01); G06F 13/426 (2013.01); H02J 7/0004 (2013.01); H02J 7/007 (2013.01)

(58) Field of Classification Search
USPC ......... 710/17, 18, 313; 714/43; 320/134, 103, 320/114; 726/27, 29; 455/74
See application file for complete search history.

(56) References Cited

U.S. PATENT DOCUMENTS

| | | | |
|---|---|---|---|
| 6,735,720 B1 * | 5/2004 | Dunn et al. ..................... | 714/43 |
| 6,941,114 B1 * | 9/2005 | Kuo et al. ........................ | 455/74 |
| 8,237,414 B1 * | 8/2012 | Li et al. .......................... | 320/160 |
| 8,819,301 B2 * | 8/2014 | Lai et al. ......................... | 710/10 |
| 2004/0073912 A1 | 4/2004 | Meza | |

(Continued)

FOREIGN PATENT DOCUMENTS

| | | |
|---|---|---|
| CN | 1879276 A | 1/2008 |
| TW | 201140322 | 11/2011 |

OTHER PUBLICATIONS

"Universal Serial Bus Specification" Revision 2.0 XP-002674982. pp. 22-24 and pp. 239-245, Apr. 27, 2000.

*Primary Examiner* — Tim T Vo
*Assistant Examiner* — Phong H Dang
(74) *Attorney, Agent, or Firm* — Richard K. Huffman; James W. Huffman (57) ABSTRACT

An apparatus is provided for coupling a Universal Serial Bus (USB) device and a USB host. The apparatus includes a memory and a controller. The memory includes one or more descriptor entries. The controller is configured to obtain a descriptor of the USB device upon detection of the USB device on a USB bus, and compare the descriptor to a specific descriptor entry to generate a comparing result. Then the controller enables or disables a link path between the USB host and the USB device according the comparing result.

16 Claims, 5 Drawing Sheets

(56) References Cited

U.S. PATENT DOCUMENTS

| | | |
|---|---|---|
| 2005/0174094 A1* | 8/2005 | Purdy et al. .................... 320/134 |
| 2006/0143716 A1* | 6/2006 | Ikemoto ........................... 726/27 |
| 2007/0035276 A1 | 2/2007 | Webjorn |
| 2008/0005370 A1 | 1/2008 | Bolan et al. |
| 2008/0007212 A1 | 1/2008 | Theytaz et al. |
| 2008/0126594 A1 | 5/2008 | Monks et al. |
| 2009/0187655 A1* | 7/2009 | Banga ........................... 709/224 |
| 2010/0049881 A1* | 2/2010 | Manor et al. .................... 710/18 |
| 2010/0115296 A1 | 5/2010 | Inoue et al. |
| 2010/0146307 A1* | 6/2010 | Griffin et al. ................ 713/300 |

* cited by examiner

FIG. 1 (Prior Art)

CHARGING USB DEVICE VIA USB HOST

FIG. 2 (Prior Art)
CHARGING USB DEVICE VIA USB HOST WITH INTERVENING USB HUB

DESCRIPTOR ENTRY 500

| PID 501 | VID 502 | DC 503 | SER 504 | REM 505 | VD+ 506 | VD- 507 | CUR 508 | CDP 509 | DCP 510 | DEF 511 |

APPARATUS FOR COUPLING TO A USB DEVICE AND A HOST AND METHOD THEREOF

BACKGROUND OF THE INVENTION

1. Field of the Invention

This invention relates in general to the field of Universal Serial Bus (USB) devices, and more particularly to USB module capable of enabling or disabling a link path between a USB host and a USB device.

2. Description of the Related Art

There are literally hundreds of present data devices that communicate with a host computer via the Universal Serial Bus (USB) protocol. And not only does the USB protocol provide for communications between devices, but it also prescribes a number of charging modes, so that a portable device can be recharged as well as communicate over a USB bus.

Consider for example the ubiquitous iPhone®. When coupled to a host computer via a USB bus, the operations of syncing with an iTunes® library can be accomplished, while at the same time recharging the battery within the iPhone.

But, as one skilled in the art will appreciate, there are a number of factors that impede optimal charging of USB devices, such as the inability of a USB host or USB hub to charge a corresponding USB device when the USB host is in a power saving state. In addition, a present day USB hub is incapable of charging a downstream USB device when the USB hub is disconnected from a USB host. Finally, because prevailing USB charging specifications only prescribe a limited number of charging modes, most USB devices cannot be charged in an optimal manner.

Accordingly, what is needed is a mechanism that allows optimal charging of specific USB devices.

Also what is needed is a mechanism for optimally charging a USB device that is connected with a USB hub, where charging can be affected in the absence of a USB host.

Furthermore, what is needed is a USB charging module that is disposed in a USB hub, where charging can be affected when a connected USB host is in a power saving state.

Moreover, what is needed is a USB charging technique within a USB host, where charging can be affected when the USB host is in a power saving state.

SUMMARY OF THE INVENTION

The present invention, among other applications, is directed to solving the above-noted problems and addresses other problems, disadvantages, and limitations of the prior art.

The present invention provides a superior technique for optimally coupling a USB device and a USB host. In one embodiment, an apparatus is provided for coupling a Universal Serial Bus (USB) device and a USB host. The apparatus includes a memory and controller. The memory stores one or more descriptor entries. The controller coupled to the memory is configured to obtain a descriptor from the USB device upon detection of the USB device on a USB bus, and compare the descriptor to a specific descriptor entry to generate a comparing result. The controller enables or disables a link path between the USB host and the USB device according the comparing result.

One aspect of the present invention contemplates an apparatus for providing a method capable of coupling a Universal Serial Bus (USB) device and a USB host via a USB hub. The method includes: via a controller of the USB hub, obtaining a descriptor of the USB device upon detection of the USB device on a USB bus; comparing the descriptor to a specific descriptor entry stored in a memory of the USB hub to generate a comparing result; and enabling or disabling a link path between the USB host and the USB device according the comparing result.

BRIEF DESCRIPTION OF THE DRAWINGS

These and other objects, features, and advantages of the present invention will become better understood with regard to the following description, and accompanying drawings where.

DETAILED DESCRIPTION

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system related and business related constraints, which vary from one implementation to another. Furthermore, it will be appreciated that such a development effort might be complex and time consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In view of the above background discussion on USB charging modes and associated techniques employed within present day USB hubs and hosts charging connected USB devices, a discussion of the limitations of these present day techniques will be discussed with reference to FIGS. 1-2. Following this, a discussion of the present invention will be presented with reference to FIGS. 3-8. The present invention overcomes the limitations and disadvantages of present day USB charging techniques by providing mechanisms that enable adaptive charging of USB devices which are tailored to specifically identified devices, and which can be employed when an associated USB host device is either disconnected or in a power saving state.

Figure 1:
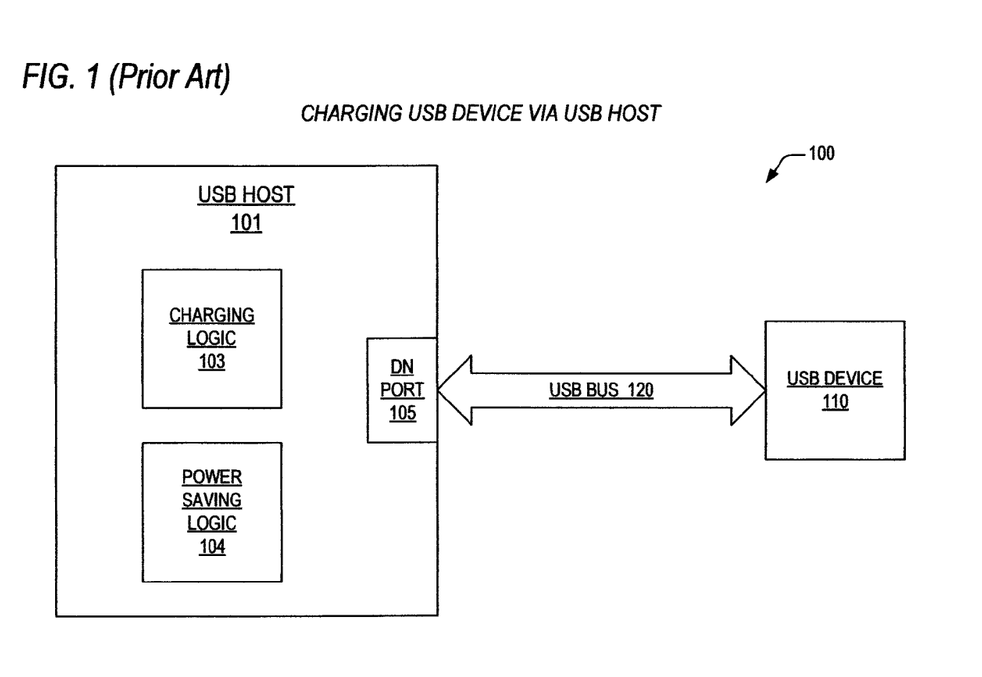
FIG. 1 is a block diagram illustrating a present day technique where a USB host is employed to charge a USB device.

Turning to FIG. 1, a block diagram 100 is presented illustrating present day technique where a USB host 101 is employed to charge a USB device 110. The USB host 101 is coupled to the USB device 110 via a Universal Serial Bus (USB) bus 120 that is in accordance with protocols and specifications comporting with USB standards up through version USB 3.0, including Wireless USB, Hi-Speed USB, and SuperSpeed USB. In addition, the USB bus 120 complies with the USB *Battery Charging Specification*, Revision 1.1, Apr. 15, 2009, hereinafter referred to as the "Charging Specification", which is available at the Universal Serial Bus website, http://www.usb.org, and which is herein incorporated by reference for all intents and purposes.

The USB host 101 includes charging logic 103, power saving logic 104, and a downstream port 105 that couples the USB host 101 to the bus 120.

In addition to communications over the USB bus 120, the USB host 101 may charge a power source (not shown) within the USB device 110 via providing voltage and current over the USB bus 120 that is compatible with the charging modes defined in the Charging Specification. That is, the downstream port 105 may be of the form of a standard charge port (SDP), a charging downstream port (CDP), or a dedicated downstream port (DCP).

The power saving logic 104 enables the USB host 101 to change power states (e.g., S3, S4, S5) according to the well known *Advanced Configuration and Power Interface (ACPI) Specification*. Accordingly, when instructed to change power states, the power saving logic 104 will enable/disable corresponding hardware and resources within the USB host 101 in order to enter the instructed power state. And as one skilled in the art will appreciate, the USB host 101 is only capable of charging in the above Charging Specification modes when it is not in a power saving (or "sleep") state.

The present inventors have observed that the inability to charge a USB device 110 when the USB host 101 is in a sleep state is disadvantageous because, among other reasons, portable devices, such as the USB device 110 of FIG. 1, may only be coupled to the USB bus 120 for a limited amount of time and, thus, may not be charged completely as a result of the inability of the USB host 101 to provide charging when in a sleep state.

The present inventors have also observed that the charging modes defined in the Charging Specification (e.g., SCP, CDP, and DCP) are not necessarily optimal for charging a wide variety of power sources within different present day USB devices 110. For example, optimal charging of a given device 110 may require voltages and currents beyond that prescribed by the Charging Specification. The inability to optimally charge a USB device 110 according to its device type is also limiting.

Figure 2:
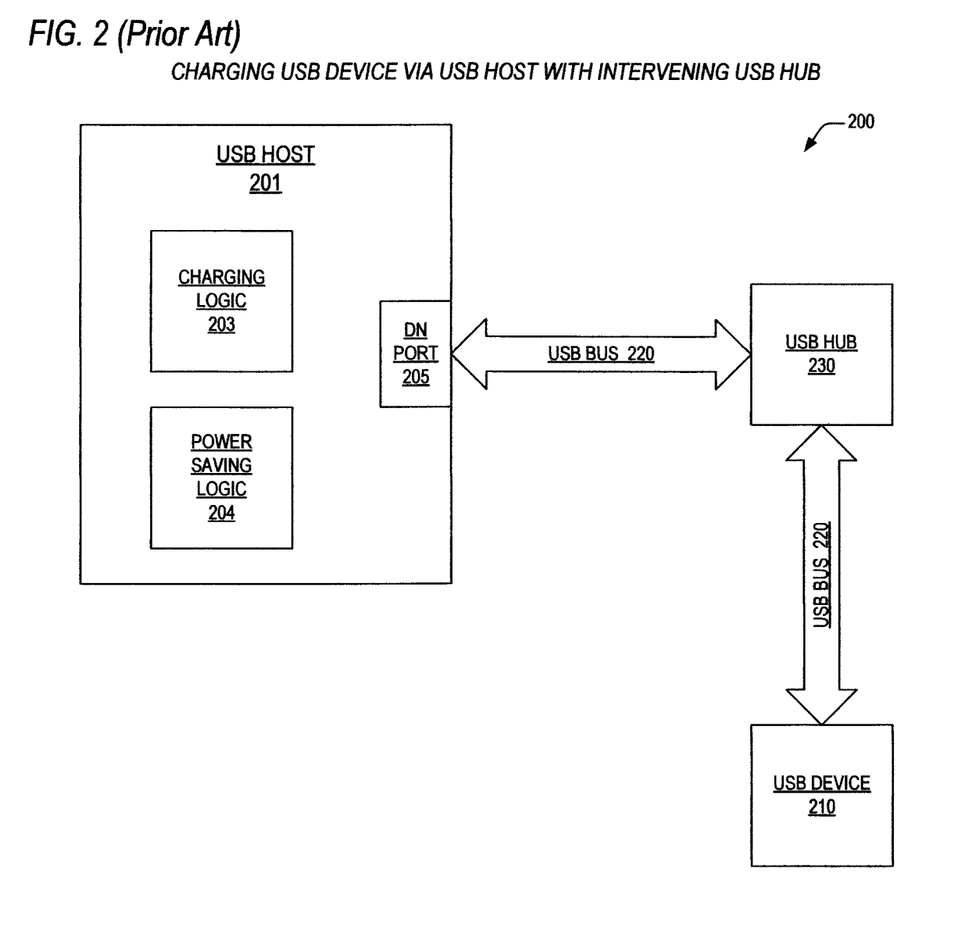
FIG. 2 is a block diagram depicting a present day technique for charging a USB device that is connected via a USB hub.

Now referring to FIG. 2, a block diagram 200 is presented depicting a present day technique for charging a USB device 210 that is connected via a USB hub 230 to a USB host 201. Like the USB host 101 of FIG. 1, the USB host 201 in FIG. 2 is coupled to the USB device 210 via a USB bus 220, except that both the USB host 201 and USB device 210 are coupled to the bus 220 via the USB hub 230. The USB hub 230 provides for expansion of the number of downstream ports available for connection to the USB host 201. As one skilled in the art will appreciate, some USB hubs 230 receive power from the USB host 201, thus limiting the types of USB devices 210 that can be coupled thereto, and other USB hubs 230 receive power from an external power source (not shown), thus enabling full power capabilities (500 mA) for each of its downstream ports.

The USB host 201 includes charging logic 203, power saving logic 204, and a downstream port 205 that couples the USB host 201 to the USB bus 220. In operation, elements of the USB host 101 function exactly as those like named elements of the USB host 101 of FIG. 1.

In addition to communications over the USB bus 220, the USB host 201 may charge a power source (not shown) within the USB device 210 by directing the USB hub 230 to provide voltage and current over the USB bus 220 that is compatible with the charging modes defined in the Charging Specification. The power is provided to the USB device 210 on a downstream port (not shown) of the USB hub 230 to which the USB device 210 is coupled. In the case of a powered USB hub 230, the downstream port may be of the form of a standard charge port (SDP), a charging downstream port (CDP), or a dedicated downstream port (DCP). And like the USB host 101 of FIG. 1, the USB hub 230 is only capable of charging in the above Charging Specification modes when the USB host 201 is not in a sleep state. That is, the USB hub 230 cannot charge the device 210 when the host 201 is in a power saving state, as alluded to above.

Like the USB host only configuration of FIG. 1, the present inventors have observed that the configuration of FIG. 2 is also limiting from a charging perspective because the charging can only be performed when the USB host 201 is not in a power saving state, and because only a limited number of charging modes are available per the Charging Specification. Thus, the USB device 210 may not receive optimal or timely charging.

The present invention overcomes the above noted limitations and disadvantages by providing mechanisms that allow optimal and timely charging of a downstream USB device. Some embodiments include a charging module that is disposed in a USB hub that provides for device specific charging modes and that operates when an associated USB host is in a power saving mode or even disconnected from the bus altogether. Other embodiments include a charging module disposed in a USB host that provide for continued charging even when the host is in a power saving mode. The present invention will now be described with reference to FIGS. 3-8.

Figure 3:
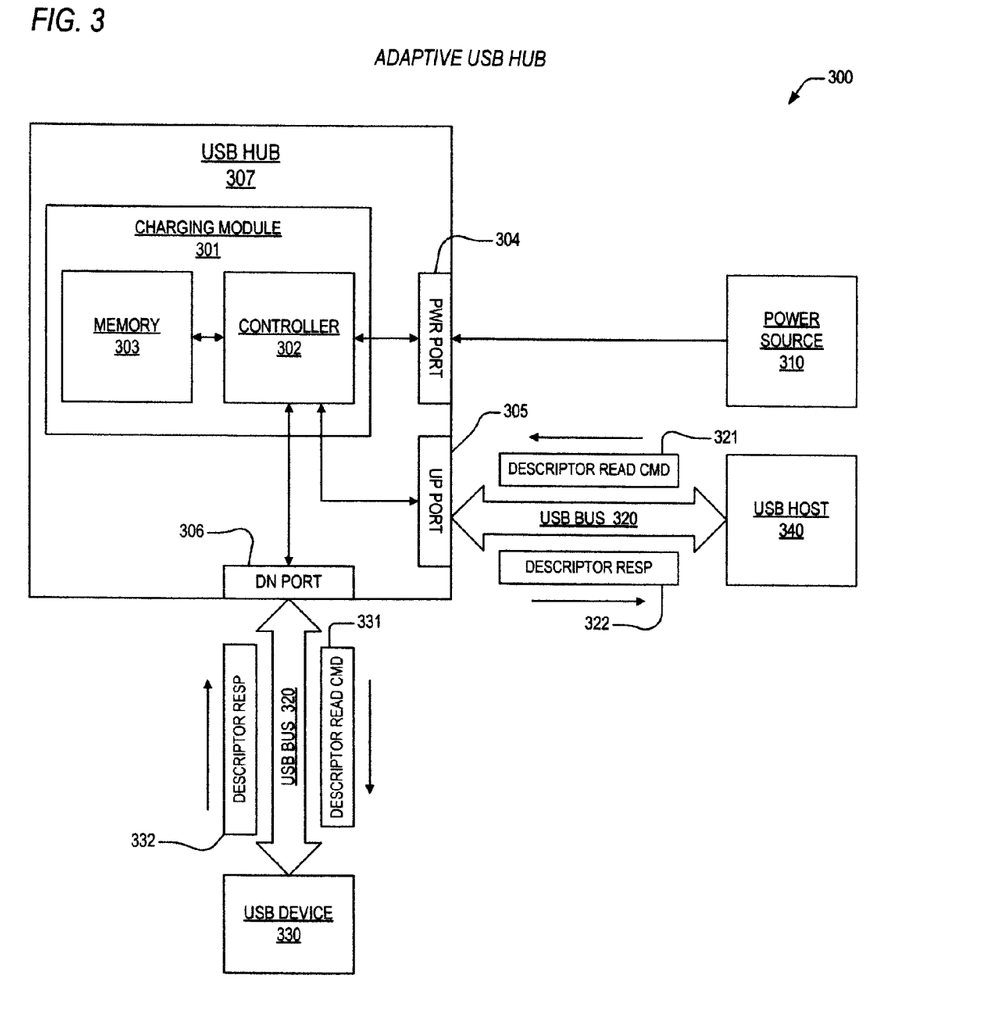
FIG. 3 is a block diagram featuring a USB hub according to the present invention that is employed to adaptively charge a USB device.

Turning to FIG. 3, a block diagram 300 is presented featuring a USB hub 307 according to the present invention that is employed to adaptively charge a USB device 330. The USB hub 307 is coupled to a power source 310 via a power port 304 and to a USB host 340 via a USB bus 320 that is coupled to an upstream port 305. The USB device 330 is coupled to the USB bus 320 via a downstream port 306 disposed in the USB hub 307. Only one downstream port 306 is shown for simplicity sake, and it is noted that the present invention contemplates a plurality of downstream ports 306 in one embodiment. The power source 310 may be any of the well known present day sources of power to include batteries, wall adapters, car power adapters, and the like.

In contrast to a present day USB hub 230, the USB hub 307 according to the present invention includes a charging module 301 that is coupled to the power port 304, the downstream port 306, and the upstream port 305. The charging module 301 includes a controller 302 that is coupled to a memory 303.

Operationally, the USB hub 307 provides for USB functions, including charging, as defined by the above noted USB standards in order to interconnect the USB host 340 to the USB device 330. In addition, the charging module 301 is configured to obtain a descriptor from the USB device 330 independently. That is, regardless of whether the USB hub 307 is coupled to the USB host 340 or not, the charging module 301 is configured to obtain a descriptor from the USB device 330 without USB host 340, while the present day USB hub 230 cannot obtain a descriptor from the USB device 210 without USB host 201. When the USB device 330 is detected on the USB bus 320, the controller 302 within the charging module 301 causes a descriptor read command 331 to be transmitted to the USB device 330 over the USB bus 320 via the downstream port 306, and receives a descriptor response 332 from the USB device 330 in order to extract the descriptor of the USB device 330. In one embodiment, the controller 302 determines via voltage level changes on the USB bus 320 the data transfer rate of the USB device 330, such as SuperSpeed (5 Gbps), high speed (480 Mbps), full speed (12 Mbps), or low speed (1.5 Mbps), and thus the controller 302 causes communications over the USB bus 320 to determine the descriptor of the device 330.

The memory 303 comprises a plurality of descriptor entries (not shown) that are programmed prior to or during deployment. The descriptor entries are associated with standard USB descriptors, and the standard USB descriptors, for example, include data, for interpreting which USB device 330 is identified, and a corresponding driver is loaded for the USB device 330. The descriptor entries also include device specific charging data, as will be discussed below. In one embodiment, the descriptor entries in the memory 303 provide for a departure from standard USB charging modes and enable the USB hub 307 to optimally charge the USB device 330. The entries may include voltages and currents assigned to various signals on the USB bus 320 and may also include indications of whether the device 330 supports CDP and DCP charging modes.

When the controller 302 receives a descriptor response 332 from the USB device 330, the descriptor is extracted and compared to the descriptor entries in the memory 303. If a match is not found, then the controller 302 operates to perform charging of the device 330 in accordance with the present day techniques discussed above with reference to FIG. 2. If the descriptor matches a descriptor entry in the memory 303, then the charging module 301 operates to provide an optimal charging mode for the USB device 330 that includes modification of voltages and currents on the USB bus 320 to optimally charge the USB device 330. For example, if the descriptor indicates that the USB device 330 is, say, an iPad®, then the charging module 301 may provide voltages and currents (i.e., 2.7 V, 2.0 V, 1.5 A) on the bus signals that will optimally charge the iPad. If the descriptor indicates that the USB device 330 is, say, a Blackberry® device, then the charging module 301 may provide voltages and currents on the bus signals that will optimally charge the Blackberry device. If the descriptor indicates that the USB device 330 supports CDP mode, then the charging module 301 operates to provide CDP mode charging of the USB device 330 via the downstream port 306. If the descriptor entry indicates that the USB device 330 supports DCP mode, then the charging module 301 operates to first short data pins (such as the D+ pin and D− pin) on the USB bus 320 and then provides a DCP charging mode to the USB device 330 when the USB host 340 is in a power saving state or even when the USB host 340 is disconnected from the bus 320. If the descriptor entry indicates that the USB device 330 does not require charging (e.g., keyboard, printer, etc.), then charging of the USB device 330 will not be provided by the charging module 301.

In one embodiment, if the USB hub 307 is coupled to the USB host 340, the USB hub 307 may obtain the descriptor from the USB device 330 when the USB device 330 has coupled to the USB hub 307. Then the USB hub 307 issues commands to the USB device 330 to cause the USB device 330 to reset, passing off control of the USB device 330 to the USB host 340, thus enabling the USB host 340 to perform normal USB enumeration operations in order to identify the USB device 330 by sending a descriptor read command 321 and receiving a descriptor response 322 from the reset USB device 330. Although not shown in the diagram 300, the descriptor read command 321 and descriptor response 322 are relayed by the hub 307 following reset. After the normal USB enumeration operations, the USB hub 307 may perform communications between the USB host 340 and the USB device 330. When the USB host 340 is disconnected from the USB hub 307 or the USB host 340 enter a power saving state (such as the S3, S4, S5), the USB hub 307 still could provide an optimal charging mode in accordance with the comparing result.

As mentioned before, the USB hub 307 may obtain the descriptor of the USB device 330 before the USB host 340 performs the normal USB enumeration operations. A comparing result could be generated by comparing the obtained descriptor with the descriptor entries in the memory 303. According to the comparing result, the USB hub 307 may determine whether to enable or disable a link path between the USB host 340 and the USB device 330. In one embodiment, the USB hub 307 may enable a link path between the USB host 340 and the USB device 330 if the comparing result indicates that the obtained descriptor matches a descriptor entry in the memory 303. Furthermore, if the link path is enabled, the USB hub 307 may determine to maintain the link path after the USB host 340 has entered a power saving mode. For example, if the descriptor entry indicates that the USB device 330 has remote wakeup capability, then the USB hub 307 may maintain the link path and continue providing power to the USB device 330. Thus the USB host 340 may be remotely awakened by the USB device 330. If the descriptor entry indicates that the USB device 330 does not have remote wakeup capability, then the USB hub 307 may disable the link path. In one embodiment, the USB hub 307 may disable the link path between the USB host 340 and the USB device 330 if the comparing result indicates that the obtained descriptor does not match any one descriptor entry in the memory 303.

In addition to the above, the charging module 301 according to the present invention operates to remedy design defects in USB devices 330. For example, if the USB device 330 has a defect such that it cannot enter a power saving state completely, its associated entry in the memory 303 can be programmed to indicate such, and when coupled to the USB hub 307 and identified, in addition to providing an optimal charging mode, the controller 302 may cause commands (not shown) to be sent to the defective USB device 330 over the USB bus 320 that, say, force a power saving state by manipulating states of hardware (not shown) within the USB device 340.

The charging module 301 according to the present invention is configured to perform the functions and operations as discussed above. The charging module 301 comprises logic, circuits, devices, or program instructions, or a combination of logic, circuits, devices, or program instructions, or equivalent elements that are employed to execute the functions and operations according to the present invention as noted. The elements employed to accomplish these operations and functions within may be shared with other circuits, program instructions, etc., that are employed to perform other functions and/or operations within the charging module 301.

Figure 4:
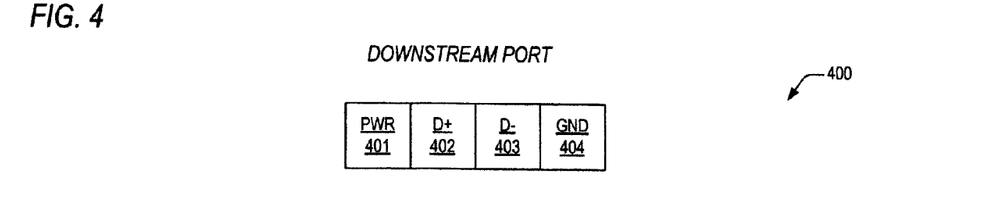
FIG. 4 is a block diagram showing exemplary pin assignments for a downstream USB port according to the present invention.

Now turning to FIG. 4, a block diagram 400 is presented showing exemplary pin assignments for a downstream USB port according to the present invention. The downstream USB port includes a power pin 401, a pair of data pins (D+ 402 and D− 403), and a ground pin 404. In one embodiment, these pins 401-404 are compatible with the above noted USB standards. As discussed with reference to FIG. 3, when a descriptor of a USB device 330 matches a descriptor entry in the memory 303, then the charging module 301 according to the present invention operates to modify the voltages and currents on the pins 401-404 accordingly, beyond those modes dictated by the Charging Specification, to allow for optimal charging of the device 330.

Figure 5:
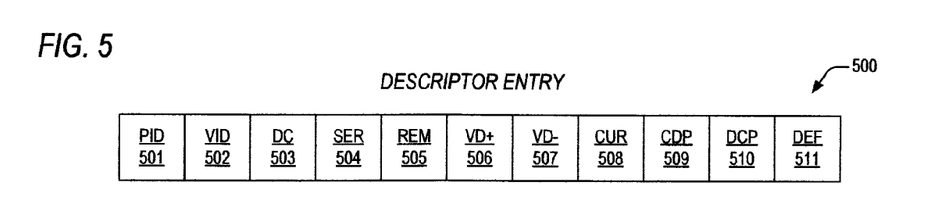
FIG. 5 is a block diagram illustrating an exemplary descriptor entry according to the present invention that is maintained in a control module for a corresponding USB device.

FIG. 5 is a block diagram illustrating an exemplary descriptor entry 500 according to the present invention that is maintained in a controller of the charging module for a corresponding USB device. The entry 500 may include a product identification (PID) field 501, a vendor identification (VID) field 502, a device class (DC) field 503, a serial number (SER) field 504, a remote wakeup capability (REM) field 505, a VD+ field 506, a VD− field 507, a current (CUR) field 508, a CDP mode field 509, a DCP mode field 510, and a defect (DEF) field 511. Operationally, the PID, VID, DC, SER, and REM fields 501-505 are compared with the corresponding data obtained from the device descriptor. In one embodiment, a product identification and a vendor identification extracted from the descriptor are respectively compared with the PID field 501 and the VID field 502. Then the charging module 301 may provide an optimal charging mode to charge the USB device 330 when the comparing result indicates that the USB device 330 belongs to a specific product (such as Apple® device or Blackberry® device) or a specific vender. The VD+, VD−, CUR, CDP, DCP, and DEF fields 506-511 are programmed into the entry to indicate the optimal charging mode for the USB device. The CDP field 509 indicates whether to provide CDP mode charging for the USB device and the DCP field 510 indicates whether to provide DCP mode charging. In one embodiment the VD+, VD−, and CUR fields 506-508 contain values indicating voltages and a current for optimally charging the USB device. The DEF field 511 indicates commands that may be transmitted to a defective USB device that control internal hardware states of the device. The exemplary entry 500 is provided to teach relevant aspects of the present invention, but it is noted that entries in the memory according to the present invention may be programmed according to other well known encoding schemes in order to identify a device and indicate how that device is to be optimally charged.

Figure 6:
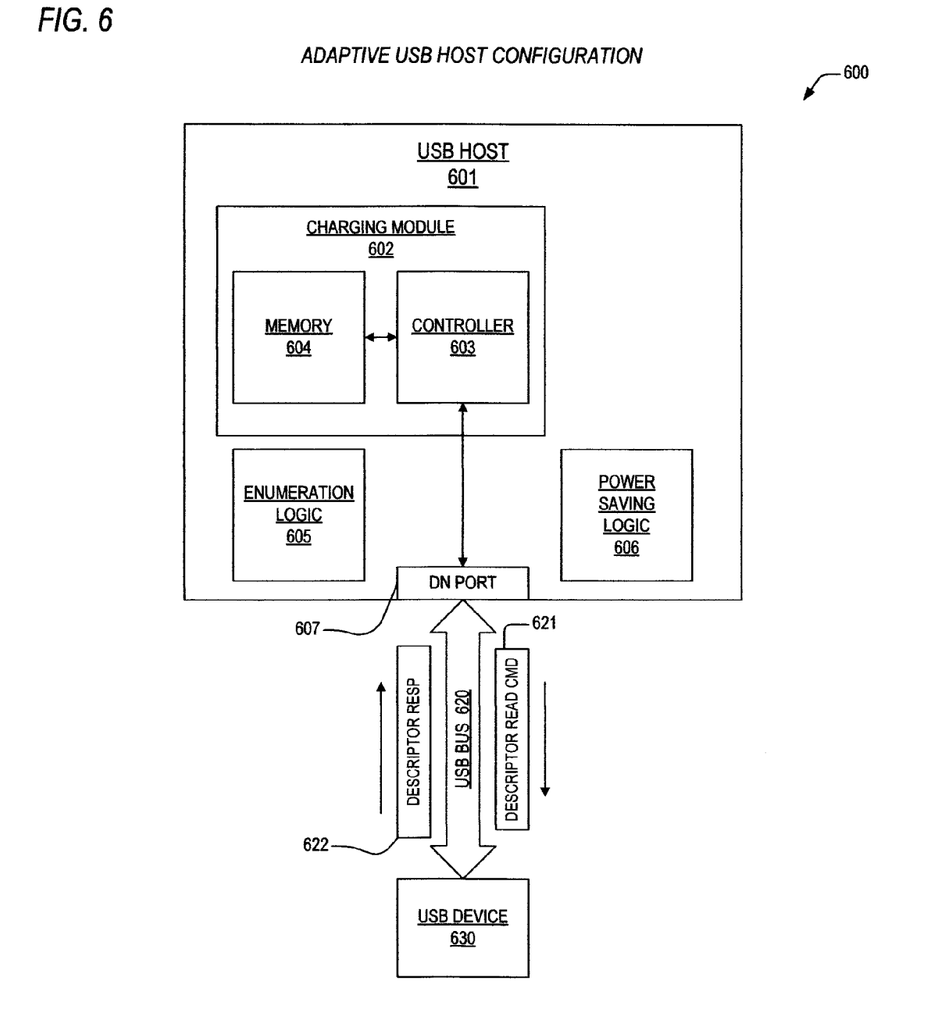
FIG. 6 is a block diagram detailing a USB host according to the present invention that is employed to adaptively charge a USB device.

Now referring to FIG. 6, a block diagram 600 is presented detailing a USB host 601 according to the present invention that is employed to adaptively charge a USB device 630. The USB host 601 according to the present invention includes enumeration logic 605 and power saving logic 606. The enumeration logic 605 generates and transmits a descriptor read command 621 to the USB device 630 over the USB bus 620. In reply, the USB device 630 transmits a descriptor response 622 back to the USB host 101 over the USB bus 120. The descriptor read command 621 and descriptor response 622 are transmitted and received via a downstream port 607 disposed within the USB host 601, and the power saving logic 606 enables the USB host 601 to change power states (e.g., S3, S4, S5) according to the well known *Advanced Configuration and Power Interface (ACPI) Specification*. The USB host 601 according to the present invention further includes a charging module 602 that is coupled to the downstream port 607 of the USB host 601. The charging module 602 comprises a controller 603 that is coupled to a memory 604, where these elements 602-603 operate in substantially the same manner and function as those like named elements discussed with reference to FIGS. 3-5, except as noted below.

In operation, rather than transmitting a descriptor read command 621 to the USB device 630 over the USB bus 620 like the charging module 301 does, the charging module 602 is aware of transmission of the descriptor read command 621 by the USB host 601, as directed by the enumeration logic 605 during normal enumeration steps. Likewise, the charging module 602 detects reception of the descriptor response 622 by the downstream port 607 and simultaneously extracts the descriptor from the response 622.

After extraction of the descriptor from the response 622, the charging module 602 compares the extracted descriptor to descriptor entries (not shown) in the memory 604. If a match is not found, then the controller 603 operates to perform charging of the USB device 630 in accordance with the present day techniques discussed above with reference to FIG. 1. If the descriptor matches a descriptor entry in the memory 604, then the charging module 602 operates to provide an optimal charging mode for the device 630 that includes modification of voltages and currents on the bus 620 to optimally charge the USB device 630, as is described above with reference to FIGS. 3-5.

Figure 7:
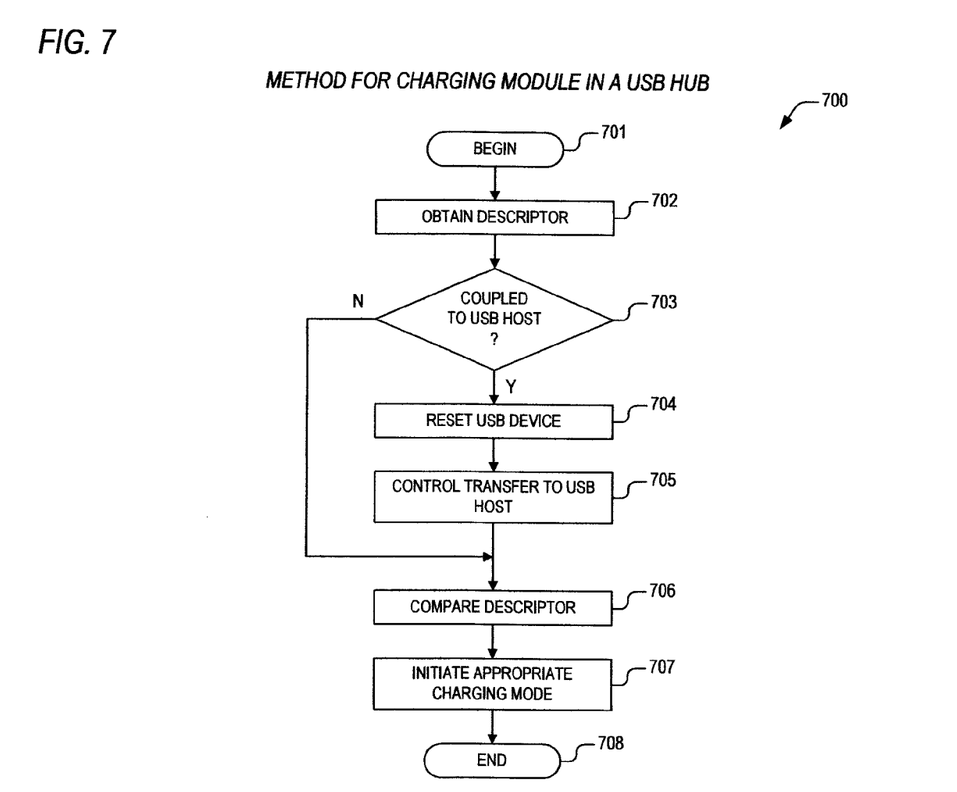
FIG. 7 is a flow diagram showing a method according to the present invention for initiating an adaptive charging mode via a charging module disposed within a USB hub.

Referring now to FIG. 7, a flow diagram 700 is presented showing a method according to the present invention for initiating an adaptive charging mode via a charging module disposed within a USB hub. The method begins at block 701 where the charging module within the USB hub detects the presence of a USB device on a downstream port of a USB bus. Flow then proceeds to block 702.

At block 702, by monitoring signals on the downstream port, the charging module determines the speed of the bus and sends a descriptor read command to the USB device. Then the USB device transmits a descriptor response, which is received at the downstream port. The charging module disposed within the USB hub obtains a descriptor of the device from the descriptor response. Flow then proceeds to decision block 703.

At decision block 703 an evaluation is made to determine if the USB hub is coupled to a USB host on an upstream port of the hub. If the hub is not coupled to the host, then flow proceeds to block 706. If the hub is coupled to the host, then flow proceeds to block 704.

At block 704, the charging module causes a USB reset command to be sent to the USB device on the downstream port, thus resulting in a reset of the USB device. Flow then proceeds to block 705.

At block 705, the USB hub transfers control of the USB device to the USB host, thus allowing the USB host to perform a normal enumeration sequence. Flow then proceeds to block 706.

At block 706, a controller within the charging module compares the descriptor obtained at block 702 to entries in a memory. Flow then proceeds to block 707.

At block 707, the charging module initiates a charging mode for the device based upon the comparison of block 706. If a matching entry was not found, then the charging mode that is initiated is in accordance with that prescribed in the Charging Specification. If a matching entry was found, then the charging mode that is initiated is in accordance with that prescribed by the matching entry. Flow then proceeds to block 708 where the method completes.

Figure 8:
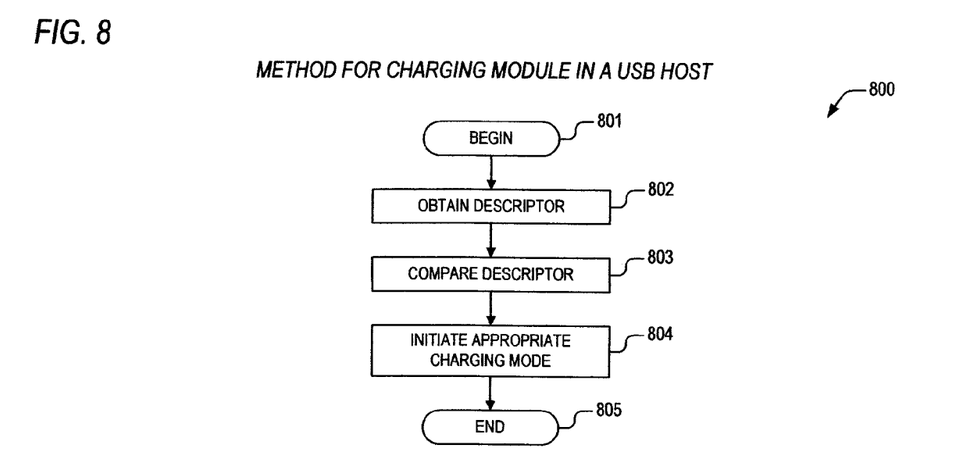
FIG. 8 is a flow diagram illustrating a method according to the present invention for initiating an adaptive charging mode via a charging module disposed within a USB host.

Turning to FIG. 8, a flow diagram 800 is presented illustrating a method according to the present invention for initiating an adaptive charging mode via a charging module disposed within a USB host. Flow begins at block 801 where the USB host detects the presence of a USB device on a downstream port of a USB bus. Flow then proceeds to block 802.

At block 802, enumeration logic within the USB host sends a descriptor command to the USB device. Then the device transmits a descriptor response, which is received at the downstream port. In parallel with the enumeration logic, the charging module disposed within a USB host obtains a descriptor of the device from the descriptor response. Flow then proceeds to block 803.

At block 803, a controller within the charging module compares the descriptor obtained at block 802 to entries in a memory. Flow then proceeds to block 804.

At block 804, the charging module initiates a charging mode for the device based upon the comparison of block 803. If a matching entry was not found, then the charging mode that is initiated is in accordance with that prescribed in the Charging Specification. If a matching entry was found, then the charging mode that is initiated is in accordance with that prescribed by the matching entry. Flow then proceeds to block 805 where the method completes.

Portions of the present invention and corresponding detailed description are presented in terms of software, or algorithms, and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A universal serial bus (USB) hub, for coupling to a defective USB device and a USB host, the USB hub comprising:
   a memory, storing one or more descriptor entries, comprising:
      defect data, said defect data being arranged to indicate commands to be transmitted to the defective USB device to control internal hardware states in order to force a power saving state for the defective USB device, the defective USB device having a defect such that it cannot otherwise enter said power saving state completely; and
      a descriptor, being arranged for matching the descriptor to a specific descriptor entry for the defective USB device; and
   a controller, coupled to said memory, configured to obtain the descriptor of the defective USB device upon detection of the defective USB device on a USB bus, and compare the descriptor to the specific descriptor entry to generate a comparing result;
   Wherein the controller enables or disables a link path between the USB host and the defective USB device according to the comparing result.

2. The USB hub as recited in claim 1, wherein the controller enables the link path when the comparing result indicates that the descriptor matches to the specific descriptor entry.

3. The USB hub as recited in claim 1, wherein, when the link path is enabled and the comparing result indicates that the defective USB device has remote wakeup capability, the controller maintains the link path when the USB host is operated in a power saving mode.

4. The USB hub as recited in claim 1, wherein said controller disables the link path when the comparing result indicates that the descriptor does not match to any one of said one or more descriptor entries.

5. The USB hub as recited in claim 1, wherein the controller is configured to initiate an optimal charging mode to charge the defective USB device according to the comparing result.

6. The USB hub as recited in claim 5, wherein the specific descriptor entry comprises one or more fields that specify one or more voltages and a current to apply to associated signals on the USB bus.

7. The USB hub as recited in claim 5, wherein the controller initiates the optimal charging mode to charge the defective USB device when the USB host is operated in a power saving state or is disconnected from the USB hub.

8. A method capable of coupling a defective Universal Serial Bus (USB) device and a USB host via a USB hub, the method comprising:
   via a controller of the USB hub, obtaining a descriptor of the defective USB device upon detection of the defective on a USB bus, the controller obtaining the descriptor by causing a descriptor read command to be transmitted to the defective USB device over the USB bus;
   comparing the descriptor to a specific descriptor entry stored in a memory of the USB hub to generate a comparing result, wherein the specific descriptor entry comprises defect data, being arranged to indicate commands to be transmitted to the defective USB device to control internal hardware states in order to force a power saving state for the defective USB device, the defective USB device having a defect such that it cannot otherwise enter the power saving state completely, and wherein the descriptor is arranged for matching the descriptor to the specific descriptor entry for the defective USB device; and
   Enabling or disabling a link path between the USB host and the defective USB device according to the comparing result.

9. The method as recited in claim 8, wherein the controller enables the link path when the comparing result indicates that the descriptor matches to the specific descriptor entry.

10. The method as recited in claim 8, further comprising:
    when the link path is enabled and the comparing result indicates that the defective USB device has remote wakeup capability, maintaining the link path when the USB host is operated in a power saving mode.

11. The method as recited in claim 8, wherein the specific descriptor entry comprises one or more fields that specify one or more voltages and a current to apply to associated signals on the said USB bus.

12. The method as recited in claim 8, further comprising:
    initiating an optimal charging mode to charge the defective USB device according to the comparing result.

13. The method as recited in claim 12, wherein the optimal charging mode is initiated when the USB host is operated in a power saving state or is disconnected from the USB hub.

14. The USB hub as recited in claim 1, wherein the controller is further configured to obtain the descriptor by causing a descriptor read command to be transmitted to the defective USB device over the USB bus.

15. The USB hub as recited in claim 14, wherein the controller is further configured to issue a reset command to be transmitted to the defective USB device after obtaining the descriptor, thereby allowing for normal enumeration procedures by the said USB host.

16. The method as recited in claim 8, further comprising:
    issuing a reset command to be transmitted to the defective USB device after obtaining the descriptor, thereby allowing for normal enumeration procedures by the USB host.

\* \* \* \* \*